United States Patent [19]

Sakai et al.

[11] 3,923,693

[45] Dec. 2, 1975

[54] CATALYST FOR REDUCING NITROGEN OXIDES CONTAINED IN COMBUSTION EXHAUST GAS, AND PROCESS FOR PREPARING SAME

[75] Inventors: Toshiyuki Sakai, Funabashi; Kazuhide Miyazaki, Tanashi; Kiyomi Abe, Kokubunji, all of Japan

[73] Assignee: Mitsui Mining & Smelting Co., Ltd., Tokyo, Japan

[22] Filed: Jan. 28, 1974

[21] Appl. No.: 437,017

[30] Foreign Application Priority Data

Jan. 31, 1973  Japan................................ 48-11917

[52] U.S. Cl............... 252/459; 252/466 J; 252/472; 423/213.2; 423/213.5
[51] Int. Cl.². B01J 21/04; B01J 21/06; B01J 23/74
[58] Field of Search................ 252/466 J, 472, 459; 423/213.2, 213.5

[56] References Cited

UNITED STATES PATENTS

| | | | |
|---|---|---|---|
| 3,133,029 | 5/1964 | Hoekstra.......................... | 423/213.2 |
| 3,259,453 | 7/1966 | Stiles................................ | 423/213.2 |
| 3,493,325 | 2/1970 | Roth................................. | 252/466 J |
| 3,565,574 | 2/1971 | Kearby et al. .................. | 252/474 X |
| 3,656,915 | 4/1972 | Tourtellotte..................... | 423/213.2 |
| 3,701,823 | 10/1972 | Hardison.......................... | 423/213.2 |

*Primary Examiner*—W. J. Shine
*Attorney, Agent, or Firm*—Bucknam and Archer

[57] ABSTRACT

A catalyst for reducing nitrogen oxides contained in combustion exhaust gas, comprising at least one powdery carbonyl metal prepared by the thermal decomposition of the corresponding metal carbonyl; and a process for the preparation of the catalyst.

11 Claims, No Drawings

CATALYST FOR REDUCING NITROGEN OXIDES CONTAINED IN COMBUSTION EXHAUST GAS, AND PROCESS FOR PREPARING SAME

This invention relates to a catalyst for the reduction of nitrogen oxides contained in combustion exhaust gas and to a process for preparing the same. More particularly it relates to a catalyst which is effectively used in reducing nitrogen oxides contained in combustion exhaust gas with carbon monoxide, hydrocarbons and the like contained therein, to nitrogen, carbonic acid gas, carbon monoxide which will very often be converted to carbonic acid gas later, water and the like, and further relates to a process for preparing the catalyst. Herein, nitrogen oxide or oxides and carbon monoxide are hereinafter referred to as "NOx" and "CO," respectively.

It has heretofore been known that copper-nickel alloys, that is, monel metals may be used as a catalyst for reducing NOx. However, these conventional catalysts were not entirely satisfactory since they would exhibit a reduction ratio of about 70% at most when put to immoderate uses such as those for purification of automobile exhaust gas.

An object of this invention is to provide a catalyst which will exhibit far more excellent reducing capability than the conventional monel metal catalyst even when used under severe conditions, for example when used for purifying automobile exhaust gas.

Another object of this invention is to provide a process for the preparation of catalysts having such excellent reducing capability.

Many studies have been made on various powdery metals by the inventors to find how they are effective in reducing NOx and, as a result, it has been found that powdery carbonyl metals that is, the metals obtained by the thermal decomposition of the corresponding metal carbonyls, referred hereinafter as powdery carbonyl metals, are very catalytically effective in the reduction of NOx. This invention has been accomplished on the basis of this discovery.

The catalysts of this invention are those comprising at least one member selected from the powdery carbonyl metals as the catalytically effective component. The powdery carbonyl metals used herein are each a finely powdery one obtained by the thermal decomposition of a metal carbonyl, and they include those therein the metal is a transition metal such as vanadium, chromium, manganese, iron, cobalt, nickel, molybdenum, tungsten, ruthenium, rhodium, iridium or rhenium. Among others, iron, cobalt and nickel are preferable. The term "carbonyl metals" as used herein designates the metals obtained in powdery form, obtained by thermal decomposition of the metal carbonyls, for instance iron from $Fe(CO)_5$.

The catalysts of this invention are usually used in the form of pellets, flake, sheet, honeycomb or the like except in unusual cases where they are suspended for their use in gases. These forms are usually made by a compression molding method, that is, a compacting method wherein a mold is used. Since the powdery carbonyl metals, however, have poor moldability or compactibility they are incorporated with one or more compactibility-improving materials before molded. The catalysts of this invention containing such carbonyl metal or metals are to be used in gases at high temperatures and, therefore, the compactibility-improving materials include alumina (alumina used herein including the anhydrous and hydrates thereof), silica, magnesia and other heat-resistant artificial and natural ceramics containing them (the natural ceramics used herein being defined to be naturally occurring materials consisting of the same components as the artificial ceramics), with alumina being particularly recommended for use in the preparation of catalysts for purifying automobile exhaust gas from the view point of both its excellent heat resistance and strength. The mixing ratios between the powdery carbonyl metal and the ceramic material are limited because of incompatibility of catalytic activity and compactibility required. Thus it is usually preferable to have 1–20 mols of the powdery carbonyl metal dispersed in one liter of the ceramic material; if, in this case, the metal is powdery carbonyl iron and the ceramic material is alumina, the powdery iron will amount to approximately 5–50% by weight of the total catalyst (consisting of the iron and the alumina).

The molded catalysts according to this invention are prepared by thoroughly mixing a mixture of the carbonyl metal powder and the powdered ceramic material, compacting the thoroughly blended mixture in a desired die usually under a pressure of about 2–5 t/cm$^2$ and then sintering the compacted mixture at a temperature for a period of time, the temperature and period of time being respectively suitable correspondingly to the nature of the ceramic material used (there are usually used temperatures of 500°–900°C and periods of time of 2–5 hours when the ceramic material used is an alumina hydrate). If in this case a foaming agent is added to the powdery metal and ceramic material while the latter two are together mixed, the molded and sintered catalyst to be obtained will have an increased porosity thereby enhancing its catalytic activity. The foaming agents which may effectively be used herein, should be those which do not exude during the compacting operation and decompose and vaporize at temperatures lower than the sintering temperature; they typically include ammonium chloride, ammonium carbonate, oxalic acid, azodicarbonamide and azobisisobutyronitrile. The amount of the foaming agents used may widely vary depending on the activity and strength required on the molded, sintered catalysts being obtained. If, however, these catalysts being obtained are to be used as those for purifying automobile exhaust gas, it is very often preferable from a consideration of both catalytic activity and strength that the foaming agents are used in amounts of approximately 2–7% by weight of the total of the powdery carbonyl metal and ceramic material used.

The catalysts of this invention are highly capable of reducing NOx. Those which are prepared by the process of this invention wherein the foaming agent is used as the additive, are especially excellent in reducing capability. The catalysts of this invention are thus very useful in the purification of combustion exhaust gas.

This invention will be better understood by the following examples wherein all the parts are by weight unless otherwise specified.

EXAMPLE 1

Thirty parts of powdery carbonyl iron and 70 parts of powdery gibbsite were together mixed to form a uniform mixture which was compacted to a sheet under a pressure of 3 t/cm$^2$ and sintered at 700°C for 3 hours to obtain a catalyst of this invention. The catalyst so obtained was then crushed to produce therefrom flakes (these flakes being designated as "novel catalyst I") which were similar in shape to conventional catalysts being used for comparison.

For comparison, a commercially available rod made of monel metal (Ni 68%, Cu 32%) was cut into chips (these chips being designated as "comparative catalyst A"), and the procedure of Example 1 was followed except that the powdery carbonyl iron was substituted by a powdery reduced iron which was commercially available, to obtain a catalyst (this catalyst being designated as "comparative catalyst B") similar in shape to the novel catalyst I.

The aforesaid three kinds of catalysts were comparatively tested for their reducing capability in terms of reduction ratio for NOx, using as the test gas an exhaust gas (this gas comprising NOx, 1000 ppm; CO, 1.7%; and $O_2$, 1.2%, each by volume) discharged from an automobile with a 6-cylinder engine of 1600-cc displacement being operated correspondingly to drive the automobile at a speed of 80 Km/hr. The tests were made under the conditions that the space velocity at which the gas to be purified was passed through the catalyst bed was fixed at $20 \times 10^3$ $hr^{-1}$ for each test and the temperatures of the gas at the inlet of the catalyst bed were kept at 500°C, 600°C and 700°C for the tests, respectively, as indicated in Table 1. The results are shown in Table 1.

Table 1

| Catalyst | Gas temperature | | |
|---|---|---|---|
| | 700°C | 600°C | 500°C |
| Novel catalyst I | 77% | 65% | 35% |
| Comparative catalyst A | 70% | 45% | 15% |
| Comparative catalyst B | 30% | 10% | 7% |

EXAMPLE 2

In order to obtain Novel catalysts II, III and IV, the procedure of Example 1 (preparation of Novel catalyst I) was followed except that the ingredients used were substituted by the following:

For Novel catalyst II:
30 parts of powdery carbonyl iron,
70 parts of powdery boehmite and
5 parts of ammonium chloride For Novel catalyst III:
40 parts of powdery carbonyl nickel,
60 parts of powdery bayerite and
4 parts of ammonium carbonate For Novel catalyst IV:
5 parts of powdery carbonyl iron,
5 parts of powdery carbonyl nickel,
90 parts of powdery gibbsite and
2 parts of azodicarbonamide Using the same test gas as used in Example 1, these three Novel catalysts II to IV and the same Novel catalyst I as used in Example 1 were tested for their respective reducing capabilities in terms of reduction ratios for NOx under the test conditions that the temperature of the gas at the inlet of the catalyst bed was fixed at 600°C for each test and the space velocities were kept at $35 \times 10^3$, $25 \times 10^3$ and $20 \times 10^3$ $hr^{-1}$ for the tests, respectively, as indicated in Table 2. The results are shown in Table 2.

Table 2

| Catalyst | Space velocity | | |
|---|---|---|---|
| | $35\times10^3$ $hr^{-1}$ | $25\times10^3$ $hr^{-1}$ | $20\times10^3$ $hr^{-1}$ |
| Novel catalyst I | 35% | 60% | 65% |
| Novel catalyst II | 65% | 85% | 85% |
| Novel catalyst III | 67% | 85% | 86% |
| Novel catalyst IV | 62% | 78% | 80% |

As is apparent from Examples 1 to 2, the catalysts of this invention containing at least one powdery carbonyl metal as the catalytically effective component are excellent in capability of reducing NOx as compared with the conventional "Monel" metal catalysts and the other ones containing a conventional powdery metal other than the powdery carbonyl metals and, in particular, the catalysts prepared by the process of this invention have a remarkably excellent reducing capability.

What is claimed is:
1. A catalyst for reducing nitrogen oxides contained in combustion exhaust gas, comprising as the catalytically effective component at least one carbonyl metal which is a member selected from the group consisting of powdery carbonyl iron, carbonyl cobalt and carbonyl nickel, said powdery carbonyl metal being the metal produced by the thermal decomposition of the corresponding metal carbonyls.

2. A catalyst according to claim 1 wherein the catalytically effective component is dispersedly held in a heat-resistant ceramic material, said catalyst being prepared by mixing together said at least one powdered metal carbonyl, a powdered ceramic material and a foaming agent to form a mixture, compacting the mixture under pressure to obtain a compacted mass and heating the compacted mass to its sintering temperature for a sufficient time to obtain the catalyst.

3. A catalyst according to claim 2, wherein the heat-resistant ceramic material is alumina.

4. A catalyst according to claim 2, wherein the catalytically effective component is held in the ceramic material in amounts of from 1 to 20 mols per liter of the ceramic material.

5. A catalyst for reducing nitrogen oxides contained in combustion exhaust gas, prepared by (1) mixing at least one carbonyl metal which is a member selected from the group consisting of powdery carbonyl iron, carbonyl cobalt and carbonyl nickel, the powdery carbonyl metal being produced by the thermal decomposition of the corresponding metal carbonyl with a powdered ceramic material and a foaming agent, compacting the mixture under pressure and heating the thus compacted mass to its sintering temperature for a sufficient time to obtain a catalyst.

6. A process for the preparation of a catalyst for reducing nitrogen oxides contained in combustion exhaust gases, characterized by mixing at least one powdery carbonyl metal selected from the group consisting of powdery carbonyl iron, carbonyl cobalt and carbonyl nickel, said carbonyl metal being produced by thermal decomposition of the corresponding metal carbonyl with a powdered ceramic material and a foaming agent to form a mixture thereof, compacting the mixture under pressure and heating the thus-compacted mass to its sintering temperature for a sufficient time to obtain the catalyst.

7. A process according to claim 6 wherein the powdered ceramic material is alumina, silica or magnesia.

8. A process according to claim 7, wherein the pressure is 2–5 ton/cm$^2$, the sintering temperature is 500°–900°C and the sintering time is 2–5 hours.

9. A process according to claim 6, wherein the powdery carbonyl metal is used in the amounts of from 1 to 20 mols per mol of the powdered ceramic material.

10. A process according to claim 6, wherein the foaming agent is a member selected from the group consisting of ammonium chloride, ammonium carbonate, oxalic acid, azodicarbonamide and azobisisobutyronitrile.

11. A process according to claim 6, wherein the foaming agent is used in amounts of 2–7% by the total weight of the powdered carbonyl metal and ceramic material.

* * * * *